(12) United States Patent
Iwasa et al.

(10) Patent No.: US 9,348,915 B2
(45) Date of Patent: May 24, 2016

(54) RANKING SEARCH RESULTS

(75) Inventors: Ken Iwasa, Rockville, MD (US); Seth Michael Murray, Redwood City, CA (US); Goldee Udani, Gujart (IN)

(73) Assignee: Comcast Interactive Media, LLC, Philadelphia, PA (US)

( * ) Notice: Subject to any disclaimer, the term of this patent is extended or adjusted under 35 U.S.C. 154(b) by 0 days.

(21) Appl. No.: 13/464,186

(22) Filed: May 4, 2012

(65) Prior Publication Data

US 2012/0221566 A1 Aug. 30, 2012

Related U.S. Application Data

(63) Continuation of application No. 12/402,897, filed on Mar. 12, 2009, now Pat. No. 8,176,043.

(51) Int. Cl.
| | | |
|---|---|---|
| *G06F 7/00* | (2006.01) | |
| *G06F 17/30* | (2006.01) | |
| *H04N 7/173* | (2011.01) | |
| *H04N 21/25* | (2011.01) | |
| *H04N 21/482* | (2011.01) | |

(52) U.S. Cl.
CPC .... *G06F 17/30864* (2013.01); *G06F 17/30038* (2013.01); *G06F 17/30053* (2013.01); *G06F 17/30817* (2013.01); *H04N 7/17318* (2013.01); *H04N 21/252* (2013.01); *H04N 21/4826* (2013.01)

(58) Field of Classification Search
CPC ................... G06F 17/30864; G06F 17/30867; G06F 17/30038; G06F 17/30053; G06F 17/30817
USPC ......................................................... 707/723
See application file for complete search history.

(56) References Cited

U.S. PATENT DOCUMENTS

| | | |
|---|---|---|
| 4,227,177 A | 10/1980 | Moshier |
| 5,493,677 A | 2/1996 | Balogh et al. |
| 5,521,841 A | 5/1996 | Arman et al. |

(Continued)

FOREIGN PATENT DOCUMENTS

| | | |
|---|---|---|
| CA | 2688921 | 12/2009 |
| CA | 2689376 | 12/2009 |

(Continued)

OTHER PUBLICATIONS

Messer, Alan et al., "SeeNSearch: A Context Directed Search Facilitator for Home Entertainment Devices", Paper, Samsung Information Systems America Inc., San Jose, CA.

(Continued)

*Primary Examiner* — Azam Cheema
(74) *Attorney, Agent, or Firm* — Banner & Witcoff, Ltd.

(57) ABSTRACT

Content items and other entities may be ranked or organized according to a relevance to a user. Relevance may take into consideration recency, proximity, popularity, air time (e.g., of television shows) and the like. In one example, the popularity and age of a movie may be used to determine a relevance ranking Popularity (i.e., entity rank) may be determined based on a variety of factors. In the movie example, popularity may be based on gross earnings, awards, nominations, votes and the like. According to one or more embodiments, entities may initially be categorized into relevance groupings based on popularity and/or other factors. Once categorized, the entities may be sorted within each grouping and later combined into a single ranked list.

13 Claims, 10 Drawing Sheets

(56) References Cited

U.S. PATENT DOCUMENTS

| | | |
|---|---|---|
| 5,530,859 A | 6/1996 | Tobias, II et al. |
| 5,535,063 A | 7/1996 | Lamming |
| 5,553,281 A | 9/1996 | Brown et al. |
| 5,576,755 A | 11/1996 | Davis et al. |
| 5,594,897 A | 1/1997 | Goffman |
| 5,640,553 A | 6/1997 | Schultz |
| 5,649,182 A | 7/1997 | Reitz |
| 5,666,528 A | 9/1997 | Thai |
| 5,682,326 A | 10/1997 | Klingler et al. |
| 5,717,914 A | 2/1998 | Husick et al. |
| 5,729,741 A | 3/1998 | Liaguno et al. |
| 5,737,495 A | 4/1998 | Adams et al. |
| 5,737,734 A | 4/1998 | Schultz |
| 5,742,816 A | 4/1998 | Barr et al. |
| 5,761,655 A | 6/1998 | Hoffman |
| 5,765,150 A | 6/1998 | Burrows |
| 5,799,315 A | 8/1998 | Rainey et al. |
| 5,819,292 A | 10/1998 | Hitz et al. |
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,937,422 A | 8/1999 | Nelson et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,167,377 A | 12/2000 | Gillick et al. |
| 6,188,976 B1 | 2/2001 | Ramaswamy et al. |
| 6,278,992 B1 | 8/2001 | Curtis et al. |
| 6,320,588 B1 | 11/2001 | Palmer et al. |
| 6,343,294 B1 | 1/2002 | Hawley |
| 6,345,253 B1 | 2/2002 | Viswanathan |
| 6,363,380 B1 | 3/2002 | Dimitrova |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1 | 4/2003 | Flannery et al. |
| 6,546,385 B1 | 4/2003 | Mao et al. |
| 6,567,980 B1 | 5/2003 | Jain et al. |
| 6,675,174 B1 | 1/2004 | Bolle et al. |
| 6,698,020 B1 | 2/2004 | Zigmond et al. |
| 6,771,875 B1 | 8/2004 | Kunieda et al. |
| 6,789,088 B1 | 9/2004 | Lee et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1 | 11/2005 | McGrath et al. |
| 7,177,861 B2 | 2/2007 | Tovinkere et al. |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 | 6/2009 | Platt et al. |
| 7,584,102 B2 | 9/2009 | Hwang et al. |
| 7,739,286 B2 | 6/2010 | Sethy et al. |
| 7,788,266 B2 | 8/2010 | Venkataraman et al. |
| 7,792,812 B1 | 9/2010 | Carr |
| 7,814,267 B1 | 10/2010 | Iyengar et al. |
| 7,921,116 B2 | 4/2011 | Finkelstein et al. |
| 7,925,506 B2 | 4/2011 | Farmaner et al. |
| 7,958,119 B2 | 6/2011 | Eggink et al. |
| 7,983,902 B2 | 7/2011 | Wu et al. |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 8,527,520 B2 | 9/2013 | Morton et al. |
| 8,572,087 B1 | 10/2013 | Yagnik |
| 2001/0014891 A1 | 8/2001 | Hoffert et al. |
| 2002/0035573 A1 | 3/2002 | Black et al. |
| 2002/0087315 A1 | 7/2002 | Lee et al. |
| 2002/0143774 A1 | 10/2002 | Vandersluis |
| 2002/0194181 A1 | 12/2002 | Wachtel |
| 2003/0014758 A1 | 1/2003 | Kim |
| 2003/0033297 A1 | 2/2003 | Ogawa |
| 2003/0050778 A1 | 3/2003 | Nguyen et al. |
| 2003/0061028 A1 | 3/2003 | Dey et al. |
| 2003/0093790 A1 | 5/2003 | Logan et al. |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2003/0204513 A1 | 10/2003 | Bumbulis |
| 2004/0111465 A1 | 6/2004 | Chuang et al. |
| 2004/0117831 A1 | 6/2004 | Ellis et al. |
| 2004/0139091 A1 | 7/2004 | Shin |
| 2004/0215634 A1 | 10/2004 | Wakefield et al. |
| 2004/0225667 A1 | 11/2004 | Hu et al. |
| 2004/0254795 A1 | 12/2004 | Fujii et al. |
| 2004/0267700 A1 | 12/2004 | Dumais et al. |
| 2005/0044105 A1 | 2/2005 | Terrell |
| 2005/0060647 A1 | 3/2005 | Doan et al. |
| 2005/0091443 A1 | 4/2005 | Hershkovich et al. |
| 2005/0097138 A1 | 5/2005 | Kaiser et al. |
| 2005/0114130 A1* | 5/2005 | Java .............. G06F 17/30675 704/240 |
| 2005/0152362 A1 | 7/2005 | Wu |
| 2005/0193005 A1 | 9/2005 | Gates et al. |
| 2005/0222975 A1 | 10/2005 | Nayak et al. |
| 2006/0037046 A1 | 2/2006 | Simms et al. |
| 2006/0074671 A1 | 4/2006 | Farmaner et al. |
| 2006/0088276 A1 | 4/2006 | Cho et al. |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck et al. |
| 2006/0212288 A1 | 9/2006 | Sethy et al. |
| 2006/0235843 A1 | 10/2006 | Musgrove et al. |
| 2006/0253780 A1 | 11/2006 | Munetsugu et al. |
| 2006/0256739 A1 | 11/2006 | Seier et al. |
| 2007/0011133 A1 | 1/2007 | Chang |
| 2007/0050343 A1 | 3/2007 | Siddarammappa et al. |
| 2007/0050366 A1 | 3/2007 | Bugir et al. |
| 2007/0067285 A1 | 3/2007 | Blume et al. |
| 2007/0078708 A1 | 4/2007 | Yu et al. |
| 2007/0083374 A1 | 4/2007 | Bates et al. |
| 2007/0156677 A1* | 7/2007 | Szabo .............. G06F 17/30522 |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0233656 A1 | 10/2007 | Bunescu et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0033915 A1 | 2/2008 | Chen et al. |
| 2008/0046929 A1 | 2/2008 | Cho et al. |
| 2008/0059418 A1 | 3/2008 | Barsness et al. |
| 2008/0091633 A1 | 4/2008 | Rappaport et al. |
| 2008/0118153 A1 | 5/2008 | Wu et al. |
| 2008/0133504 A1 | 6/2008 | Messer et al. |
| 2008/0162533 A1 | 7/2008 | Mount et al. |
| 2008/0163328 A1 | 7/2008 | Philbin et al. |
| 2008/0168045 A1* | 7/2008 | Suponau .......... G06F 17/30991 |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1 | 9/2008 | Matheny |

(56) References Cited

U.S. PATENT DOCUMENTS

| | | |
|---|---|---|
| 2008/0222106 A1 | 9/2008 | Rao et al. |
| 2008/0222142 A1 | 9/2008 | O'Donnell |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2009/0006315 A1 | 1/2009 | Mukherjea et al. |
| 2009/0006391 A1 | 1/2009 | Ram |
| 2009/0013002 A1 | 1/2009 | Eggink et al. |
| 2009/0025054 A1 | 1/2009 | Gibbs et al. |
| 2009/0055381 A1 | 2/2009 | Wu et al. |
| 2009/0077078 A1 | 3/2009 | Uppala et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1 | 7/2009 | Tsui et al. |
| 2009/0198686 A1 | 8/2009 | Cushman, II et al. |
| 2009/0204599 A1* | 8/2009 | Morris ............... G06F 17/30967 |
| 2009/0205018 A1 | 8/2009 | Ferraiolo et al. |
| 2009/0240650 A1 | 9/2009 | Wang et al. |
| 2009/0240674 A1 | 9/2009 | Wilde et al. |
| 2009/0271195 A1 | 10/2009 | Kitade et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich, Jr. et al. |
| 2012/0150636 A1 | 6/2012 | Freeman et al. |
| 2012/0191695 A1 | 7/2012 | Xia |
| 2013/0054589 A1 | 2/2013 | Cheslow |

FOREIGN PATENT DOCUMENTS

| | | |
|---|---|---|
| CA | 2689379 | 12/2009 |
| CA | 2694943 | 2/2010 |
| CA | 2695709 | 3/2010 |
| CA | 2697565 | 4/2010 |
| CA | 2685833 A1 | 5/2010 |
| CA | 2703569 | 5/2010 |
| CA | 2708842 | 6/2010 |
| EP | 1241587 A1 | 9/2002 |
| EP | 1950739.1 | 2/2003 |
| EP | 1462950 A1 | 9/2004 |
| EP | 1501305 A1 | 1/2005 |
| EP | 9179987.4 | 12/2009 |
| EP | 9180762.8 | 12/2009 |
| EP | 9180776.8 | 12/2009 |
| EP | 10154725.5 | 2/2010 |
| EP | 09815446.1 | 3/2010 |
| EP | 10155340.2 | 3/2010 |
| EP | 10162666.1 | 5/2010 |
| EP | 10167947 | 6/2010 |
| GB | 244875 A | 12/1925 |
| GB | 2448874 A | 11/2008 |
| GB | 2448875 A | 11/2008 |
| WO | 9950830 A1 | 10/1999 |
| WO | 0205135 A2 | 1/2002 |
| WO | 2005/050621 A2 | 6/2005 |
| WO | 2006099621 A2 | 9/2006 |
| WO | 2007115224 A2 | 10/2007 |
| WO | 2008053132 A1 | 5/2008 |
| WO | 2009052277 A1 | 4/2009 |

OTHER PUBLICATIONS

Partial European search report for application No. 10155340.2 mailed Jul. 12, 2010, 6 pages.

Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.

Kontothoanassis, Ledonias et al., "Design, Implementation, and Analysis of a Multimedia Indexing and Delivery Server", Technical Report Series, Aug. 1999, Cambridge Research Laboratory.

Extended European Search Report and Search Opinion for European application No. 10155340.

Shahraray: "Impact and Applications of Video Content Analysis and Coding in the internet and Telecommunications", AT&T Labs Research, A Position Statement for Panel 4: Applications the 1998 International Workshop on Very Low Bitrate Video Coding, 3 pages.

Kalina Bontcheva et al "Shallow Methods for Named Entity Coreference Resolution", Proc. of Taln 2002, Jan. 1, 2002.

Raphael Volz et al., "Towards ontologybased disambiguation of geographical identifiers", Proceedings of the WWW2007 Workshop I3: Identity, Identifiers, Identification, Entity-Centric Approaches to Information and Knowledge Management on the Web, Jan. 1, 2007.

Wacholder N et al., "Disambiguation of Proper Names in Text", Proceedings of the Conference on Applied Natural Language Processing, Association Computer Linguistics, Morrisontown, NJ, Mar. 1, 2007.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Steffen Staab et al., "Semantic Multimedia", Reasoning Web; Lecture Notes in Computer Science, pp. 125-170, Sep. 2008.

European Search Report EP09179987.4, dated Jun. 4, 2010.

Li, Y. et al., "Reliable Video Clock Time Recognition," Pattern Recognition, 2006, 1CPR 1006, 18th International Conference on Pattern Recognition, 4 pages.

Salton et al., Computer Evaluation of Indexing and Text Processing Journal of the Association for Computing Machinery, vol. 15, No. 1, Jan. 1968, pp. 8-36.

European Search Report for Application No. 09180776.8, mailed Jun. 7, 2010, 9 pages.

European Search Report EP 09180762, dated Mar. 22, 2010.

European Application No. 09175979.5—Office Action mailed Mar. 15, 2010.

EP Application No. 09 175 979.5—Office Action mailed Apr. 11, 2011.

Kontothoanassis, Ledonias et al. "Design, Implementation, and Analysis of a Multimedia Indexing and Delivery Server", Technical Report Series, Aug. 1999, Cambridge Research Laboratory.

European Patent Application No. 09175979.5—Office Action dated Dec. 13, 2011.

International Preliminary Examination Report for PCT/US01/20894, dated Feb. 4, 2002.

Towards a Multimedia World-Wide Web Information retrieval engines, Sougata Mukherjea, Kyoji Hirata, and Yoshinori Hara Computer Networks and ISDN Systems 29 (1997) 1181-1191.

Experiments in Spoken Document Retrieval at CMU, M.A. Siegler, M.J. Wittbrock, S.T. Slattery, K. Seymore, R.E. Jones, and A.G.

(56) References Cited

OTHER PUBLICATIONS

Hauptmann, School of Computer Science Carnegie Mellon University, Pittsburgh, PA 15213-3890, Justsystem Pittsburgh Research Center, 4616 Henry Street, Pittsburgh, PA 15213.
Eberman, et al., "Indexing Multimedia for the Internet", Compaq, Cambridge Research laboratory, Mar. 1999, pp. 1-8 and Abstract.
Ishitani, et al., "Logical Structure Analusis of Document Images Based on Emergent Computation", IEEE Publication, pp. 189-192, Jul. 1999.
First Office Action in EP01950739.1-1244 dated Mar. 27, 2009.
Chen, "Extraction of Indicative Summary Sentences from Imaged Documents", IEEE publication, 1997, pp. 227-232.
Hsin-Min Wang and Berlin Chen, "Content-based Language Models for Spoken Document Retrieval", ACM, 2000, pp. 149-155.
Marin, Feldman, Ostendort and Gupta, "Filtering Web Text to Match Target Genres", International Conference on Acoustics, Speech and Signal Processing, 2009, Piscataway, NJ, Apr. 19, 2009, pp. 3705-3708.
European Search Report for application No. 10167947.0, mailed Sep. 28, 2010.
"Ying Zhang and Phil Vines. 2004. Using the web for automated translation extraction in cross-language information retrieval. In Proceedings of the 27th annual international ACM SIGIR conference on Research and development in information retrieval (SIGIR '04). ACM, New York, NY, USA, 162-169".
Extended European Search Report—EP 09815446.1—mailing date: May 7, 2013.
IPER PCT/US2009/069644—Jun. 29, 2011.
ISR PCT/US2009/069644—Mar. 4, 2010.
ESR—EP10154725.5—Nov. 2, 2010.
ESR—EP10162666.1—Aug. 4, 2011.
ESR—EP10167947.0—Sep. 28, 2010.
ISR PCT/US2001/020894—Nov. 25, 2003.
European Office Action—EP 10154725.5—Dated Apr. 24, 2015.
Response to European Office Action—EP Appl. 9180762.8—Submitted Jul. 29, 2015.
European Office Action—EP Appl. 10162666.1—dated Jul. 10, 2015.
Response to European Office Action—EP 10162666.1—Dated Oct. 14, 2015.
Response to European Office Action—EP Appl. 10154725.5—submitted Oct. 14, 2015.
Chen, Langzhou, et al. "Using information retrieval methods for language model adaptation." Interspeech. 2001.
Sethy, Abhinav, Panayiotis G. Georgiou, and Shrikanth Narayanan. "Building topic specific language models from webdata using competitive models." Interspeech. 2005.
Canadian Office Action—CA Application 2,697,565—dated Dec. 15, 2015.
Behrang Mohit and Rebecca Hwa, 2005. Syntax-based Semi-Supervised Named Entity Tagging. In Proceedings of the ACL Interactive Poster and Demonstration Sessions, pp. 57-60.
Shumeet Baluja, Vibhu Mittal and Rahul Sukthankar, 1999. Applying machine learning for high performance named-entity extraction. In Proceedings of Pacific Association for Computational Linguistics.
R. Bunescu and M. Pasca. 2006. Using encyclopedic knowledge for named entity disambiguation. In Proceedings of EACL-2006, pp. 9-16.
S. Cucerzan. 2007. Large-Scale Named Entity Disambiguation Based on Wikipedia Data. In Proceedings of EMNLP-CoNLL 2007, pp. 708-716.
Radu Florian, 2002. Named entity recognition as a house of cards: Classifier stacking. In Proceedings of CoNL2002, pp. 175-178.
Martin Jansche, 2002. Named Entity Extraction with Conditional Markov Models and Classifiers. In Proceedings of CoNLL-2002.
Thamar Solorio, 2004. Improvement of Named Entity Tagging by Machine Learning. Reporte Tecnico No. CCC-04-004. INAOE.
European Office Action—EP Appl. 09815446.1—dated Feb. 17, 2016.
Canadian Office Action—CA Appl. 2,688,921—mailed Feb. 16, 2016.

* cited by examiner

| Case | releaseDateWeight |
|---|---|
| (The present year - 1) or later | 1.0 |
| (The present year - 10) through (the present year - 2) | 0.8 |
| (The present year - 20) through (the present year - 11) | 0.6 |
| before (the present year - 20) | 0.4 |

FIG. 7

| Case | Role Recency Factor |
|---|---|
| (the present year - 1) or later | 2.5 |
| (the present year - 2) through (the present year - 1) | 2.0 |
| (the present year - 3) through (the present year - 2) | 1.5 |
| (the present year - 4) through (the present year - 3) | 1.25 |
| before (the present year - 4) | 1.0 |

FIG. 8

| | |
|---|---|
| LIST1 CAST ORDER VALUE IS [1, 3] | 1 |
| ON LIST1, CAST ORDER VALUE > 3 | 0.1 |
| ON LIST2, NOT ON LIST1 | 0.15 |
| ON LIST1, CAST ORDER = 0 | 0.2 |
| OTHERS | 0.4 |

FIG. 9

RANKING SEARCH RESULTS

CROSS-REFERENCE TO RELATED APPLICATIONS

The application is a continuation of co-pending U.S. application Ser. No. 12/402,897 entitled "RANKING SEARCH RESULTS" and filed on Mar. 12, 2009. The content of the prior application is incorporated herein by reference in its entirety.

TECHNICAL FIELD

Aspects of the invention relate to ranking a set of items. In particular, aspects described herein relate to the ranking of content items based on relevance.

BACKGROUND

The amount of available information and content that may be accessed through user devices such as computers, set-top boxes, cell phones and the like has become staggering. To find information or content that a user is interested in, users will often submit search queries to obtain a condensed list of potentially matching or relevant results. In some instances, however, such result lists may still include a large amount of information and usually in some random order. Some systems organize search results alphabetically or according to a level of match. However, sorting by an alphabet or a level of match might not reflect a relevance to the user of the items in the list.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below One or more aspects described herein relate to the sorting of items based on relevance. Relevance may, for example, include the consideration of popularity, proximity, recency and the like. In one or more examples, items to be sorted may be assigned an entity rank indicative of each item's popularity relative to other items of the same type. Alternatively or additionally, entity ranks may be determined on a single scale for all item types. The entity rank and/or other attributes may then be used to categorize each of the items in the list into a hierarchical group. Items within each group may then be sorted according to relevance in view of a variety of factors including entity rank, proximity, recency and the like. Once the items have been sorted in each group, the groups may be combined into a single results list organized by relevance. In one or more arrangements, relevance ranks may correspond to a value that may be converted to a specified scale (e.g., 0 to 1).

According to another aspect, entity rank may be calculated for a movie based on gross earnings, release date, number of awards won or nominated for, languages included, countries in which the movie was released and a number of votes.

According to another aspect, entity ranks may be calculated for a person based on movies or other roles that the person has had. For example, a ranking system may determine a movie-person relationship rank gained based on the entity rank of the movie, a role prominence and a role recency. The top 10 (or other predefined number) movie-person relationship rank gained may then be combined to determine an overall entity rank of the person.

According to another aspect, entity ranks may be determined at a time of indexing the entity (i.e., adding to a database). In some instances, the entity rank may be modified at a time of query. The modification of the rank may be in response to how a search result item matches a search query. In one example, if a content item such as a movie is returned as a search result because the search query matches an actor listed in the cast of the movie, the entity rank of the movie may be modified based on an entity rank of the actor. In some configurations, the modified entity rank will be lower than the original entity rank.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 7 illustrates an example conversion table for determining a release date weight according to one or more aspects described herein.

FIG. 8 illustrates an example conversion table for determining a role recency factor according to one or more aspects described herein.

FIG. 9 illustrates an example conversion table for determining a role prominence factor based on casting order according to one or more aspects described herein.

DETAILED DESCRIPTION

Figure 1:
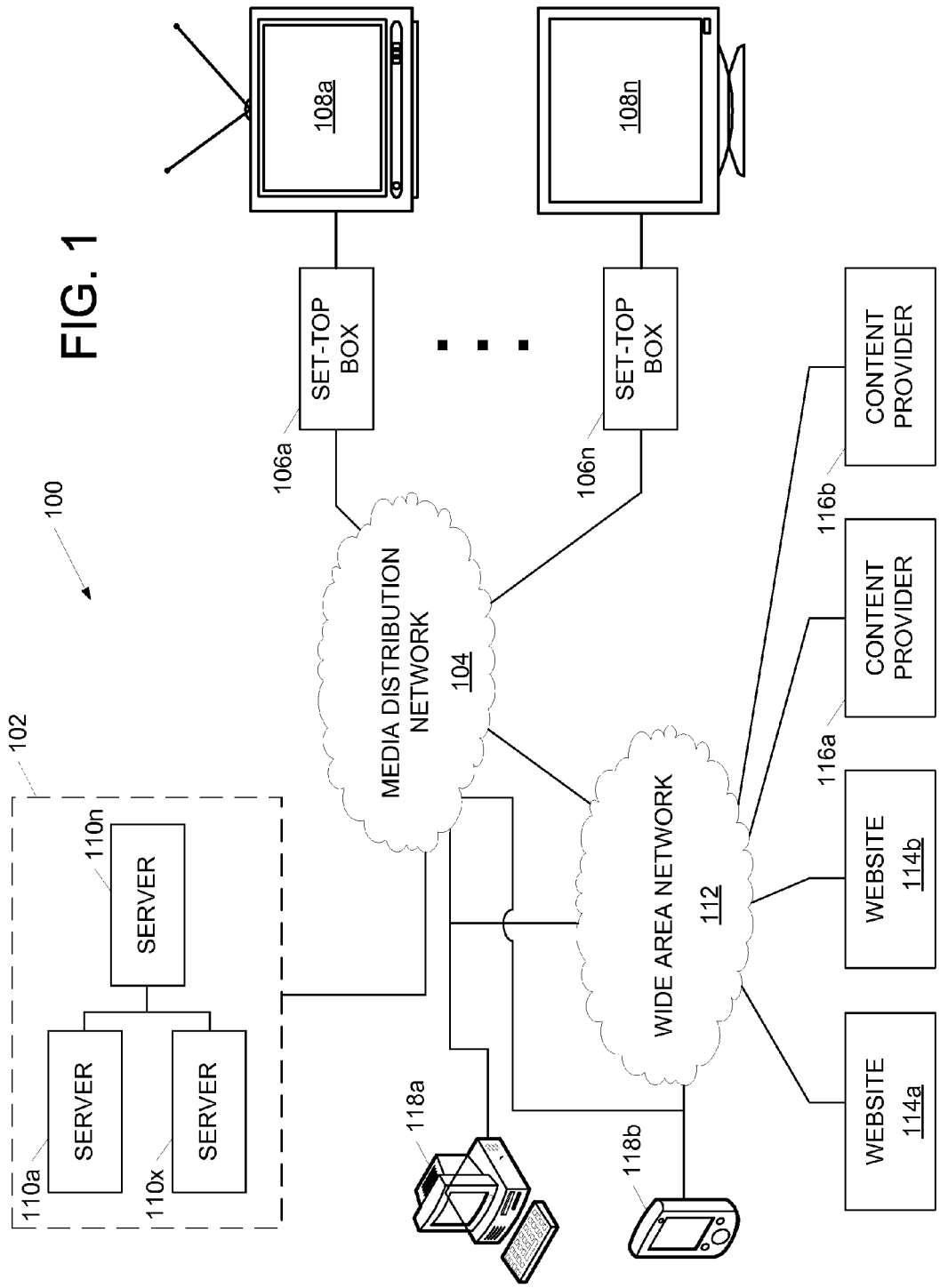
FIG. 1 illustrates an example network distribution system in which content items may be provided to subscribing clients.

FIG. 1 illustrates a content processing and distribution system 100 that may be used in connection with one or more aspects described herein. The distribution system 100 may include a headend 102, a network 104, set top boxes (STB) 106 and corresponding receiving devices (i.e., receiver, transceiver, etc.) 108. The distribution system 100 may be used as a media service provider/subscriber system wherein the provider (or vendor) generally operates the headend 102 and the network 104 and also provides a subscriber (i.e., client, customer, service purchaser, user, etc.) with the STB 106.

The STB 106 is generally located at the subscriber location such as a subscriber's home, a tavern, a hotel room, a business, etc., and the receiving device 108 is generally provided by the subscribing client. The receiving device 108 may include a television, high definition television (HDTV), monitor, host viewing device, MP3 player, audio receiver, radio, communication device, personal computer, media player, digital video recorder, game playing device, etc. The device 108 may be implemented as a transceiver having interactive capability in connection with the STB 106, the headend 102 or both the STB 106 and the headend 102.

The headend 102 is generally electrically coupled to the network 104, the network 104 is generally electrically coupled to the STB 106, and each STB 106 is generally electrically coupled to the respective device 108. The electrical coupling may be implemented as any appropriate hardwired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 100 is illustrated showing one STB 106 coupled to one respective receiving device 108, each STB 106 may be configured with the capability of being coupled to more than one device 108.

The headend 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. In one example, the headend 102 may generate and present (i.e., transmit, provide, pass, broadcast, send, etc.) the stream VIDIN. At least one of the devices 110 (e.g., a sender security device 110x), may include a security system.

In media distribution networks such as network 104 of FIG. 1, a substantial number of content items such as movies, television shows, music and articles may be made available to a subscriber or user. However, a user might only be interested in a subset of those content items. Accordingly, the user may wish to pare the list down to a number of content items of particular relevance or interest to him or her. Relevance may include consideration of user preferences, air time, content item attributes such as genre, age, actors/actresses, artist, popularity, formats available (e.g., high definition vs. standard definition) and the like. Additionally, the user may want to further sort the content items according to a level of interest or relevance to allow for efficient browsing of the various content items. For example, content items determined to be most relevant or of greatest interest to a user may be placed on the top of the list so that the user does not have to navigate or browse through numerous other content items before reaching the most relevant or interesting content items. In addition to content items, other types of entities may also be ranked.

Entities, as used herein, may refer to a person, a content item, a genre, a sports team or any other uniquely identifiable object.

Figure 2:
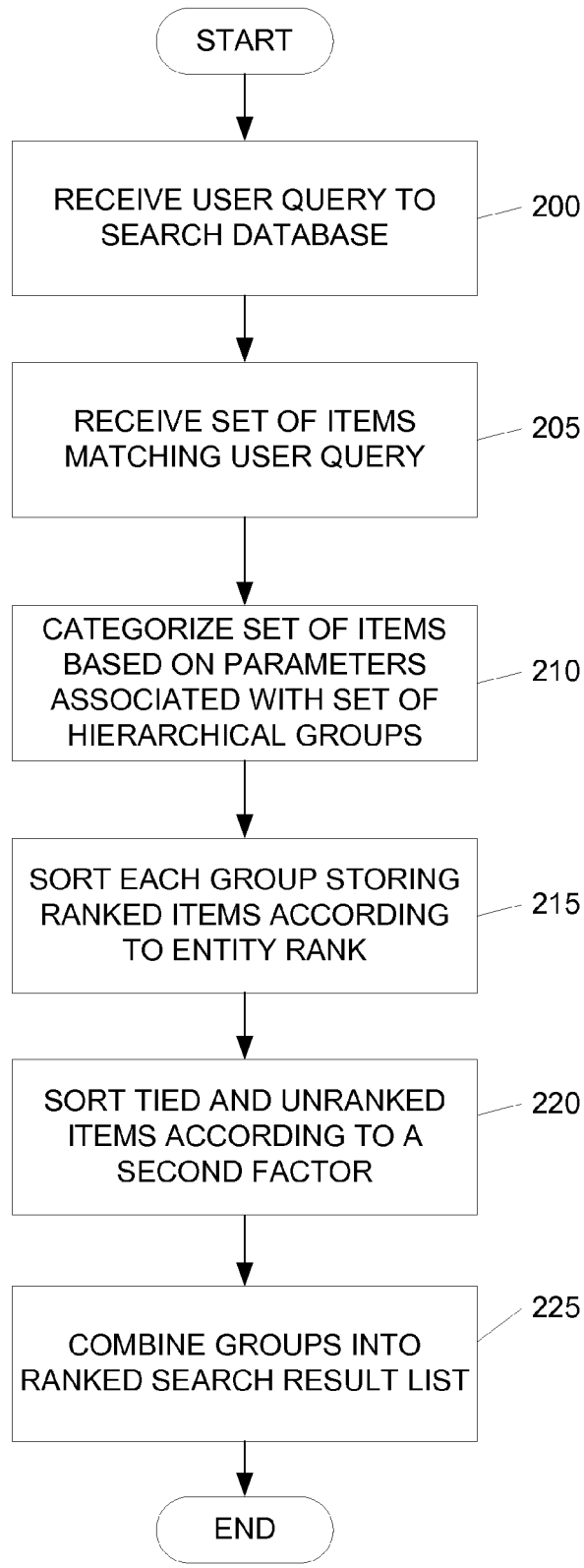
FIG. 2 illustrates an example method for determining a rank of items based on relevance according to one or more aspects described herein.

FIG. 2 illustrates an example method for ranking video content items according to user relevance. In step 200, a ranking module or system may receive a user query for searching a database of content items. In step 205, a set of content items may be received by the ranking module or system based on the user query. The user query may include words or phrases that are used to match one or more attributes of a content item (e.g., a title, names of people associated with the content item). Accordingly, those content items having a specified level of match with the user query may be returned. In step 210, the returned set of content items may be categorized according to a hierarchical set of groups or buckets. The categorization may be performed based on parameters associated with each of the groups.

Figure 3:
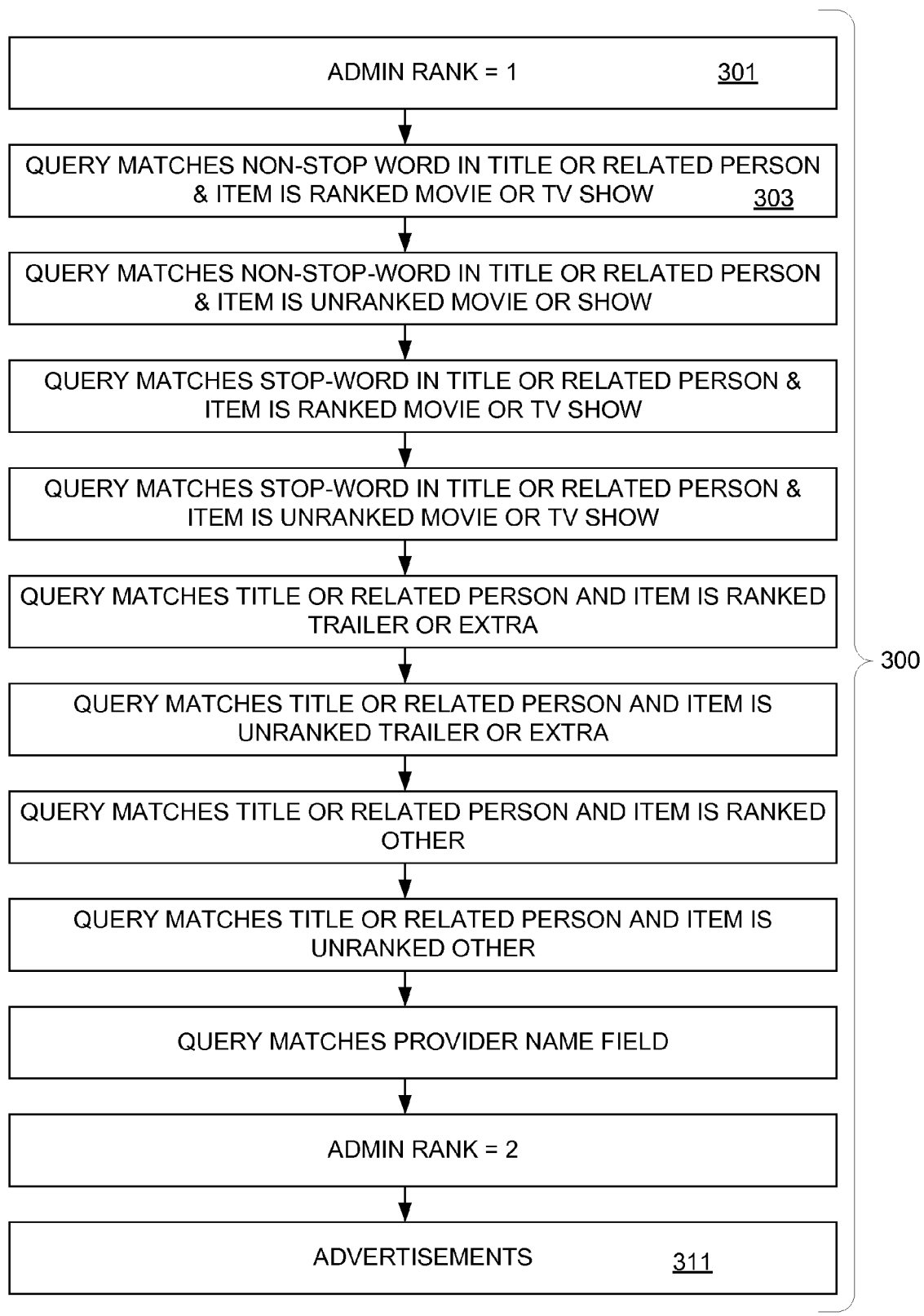
FIG. 3 illustrates an example hierarchy of groups that may be used to categorize a list of items to be ranked according to one or more aspects described herein.

FIG. 3 illustrates a hierarchy of groups in which content items may be categorized. The hierarchy may define which groups are considered more important or relevant than others. For example, in hierarchy 300, group 301 configured to store all content items or other entities with an administrative rank of 1 is considered the highest ranked group. Administrative ranks, as used herein, refer generally to ranks that are manually designated for a content item and may be used to affect the relevance rank thereof. In one or more arrangements, administrative ranks may outweigh, override or be considered more important than an entity rank. For example, an administrative rank of 1 may correspond to a user desire to raise the content item to the top of a ranked list regardless of entity rank or other considerations. The second highest ranked group 303 may be configured to store all content items with which a user query matches a non-stop-word in the title of the content item or a person associated therewith. In the illustrated hierarchy 300, a total of 12 groups are defined. The groups may vary by whether the content item is ranked or unranked, whether the content item corresponds to a trailer, extra or advertisement, whether a user query matches a provider name (or a portion thereof) and the like. A provider name may generally refer to a content provider such as G4, HBO, NBC, ABC and the like. The lowest group 311, for example, may include all advertisements. Categorization may begin with the highest ranked group 301 and trickle downward. Stated differently, a content item or other entity being ranked may first be evaluated against the parameters of the highest ranked group 301. If the content item does not match the parameters of group 301, the content item may then be compared with the second highest ranked group 303 and so on until the content item has been matched with a category.

As illustrated in FIG. 3, another parameter or attribute that may be considered for categorization is whether the search query matches a stop word or a non-stop word. Stop words refer generally to words which are filtered out prior to, or after, processing of natural language data (text). Stated differently, stop words are generally not evaluated for determining search results.

Referring again to FIG. 2, a ranking module may, after the content items have been categorized, sort each category configured to store ranked content items according to entity rank in step 215. In one or more configurations, each category or group may be sorted independently and/or separately of the other categories or groups. Entity rank, as used herein, refers generally to a popularity estimate of a particular entity based on various factors. Entity rank may be pre-determined using various formulas and methods described in further detail herein. In step 220, content items that are tied (i.e., have the same entity rank) and unranked content items may be sorted according to various factors. These factors may include a format of the content item, proximity (i.e., level of match) and recency (age of content item). The sorting may take these factors into account in a hierarchical manner. That is, conflicts or ties may be resolved by initially considering only format of the content item. If a tie persists, proximity may be evaluated and so on. If all factors are tied, the ranking of the two content items may be resolved using a database identifier (i.e., the content item having the higher database identifier is placed before the other). In step 225, the sorted groups may be combined according to the specified hierarchy into a search result list and provided to a querying user.

Evaluating proximity includes the analysis of how well a search query matches a title or other attribute of an entity. For example, if a query is "JU DI," a movie named "Juan Digs a Hole" may be ranked higher in terms of proximity than a movie named "Juan loves Diane." Additionally or alternatively, matches occurring earlier in an attribute field may be ranked above matches occurring later. In the above example query of "JU DI," a first movie named "Juan Loves Diane With All His Heart" may rank above a second movie entitled "With All His Heart, Juan Loves Diane," because the query string matches earlier in the title in the first movie. According to another aspect, if a query consists of two strings, entities having fewer words between the two matching strings may be ranked higher. For example, if a query consists of "Dig Hole," a first book entitled "Dig Me a Hole" may be ranked higher in proximity than a second book named "Dig Me a Really Really Really Big Hole." Another proximity consideration may include whether matching strings occur in reverse order of the order specified in the query.

In addition to proximity, recency and content format, other factors that may be taken into consideration for relevance ranking include expiration time (i.e., when programs are going to end), genre of the content item, user entitlements (i.e., whether a user has access to a content item based on their level of subscription and the like), field or attribute matching the user query, price of a content item, recording capability of a viewing device, search history of the user, viewing history of the user, program freshness (i.e., whether the content item is a first airing, newly released movie, season premiere or repeat) and user-designated favorites. Expiration time may be taken into consideration if some content items or types of content items such as sports programs become more exciting or interesting toward the end. Accordingly, programs that have a more recent expiration time may be ranked ahead of a later expiring program. In some arrangements, the field or attribute of a content item that matches the user query may be a ranking factor. In such instances, a content item having a title matching the user query may be ranked ahead of a content item having a director or genre matching the user query under the assumption that the title is more indicative of interest or relevance than the director or genre associated with the content.

Additionally or alternatively, the price of a content item may be used as a discriminating factor. In one example, cheaper programs may be ranked more highly than more expensive programs. Alternatively, more expensive programs may be ranked as more relevant than cheaper programs. Further and as discussed herein, programs having future air times may have a lower relevance ranking than programs that are currently airing or are soon to air. However, in some arrangements, if a viewing or receiving device has recording capability, the lower relevance ranking of a future airing program may be mitigated since the user is able to record the future program. Further, for each relevance factor, a user may specify how content items are to be ranked (e.g., whether a cheaper program is to be ranked above a more expensive program) or such rankings may be determined automatically based on a default setting.

Figure 4:
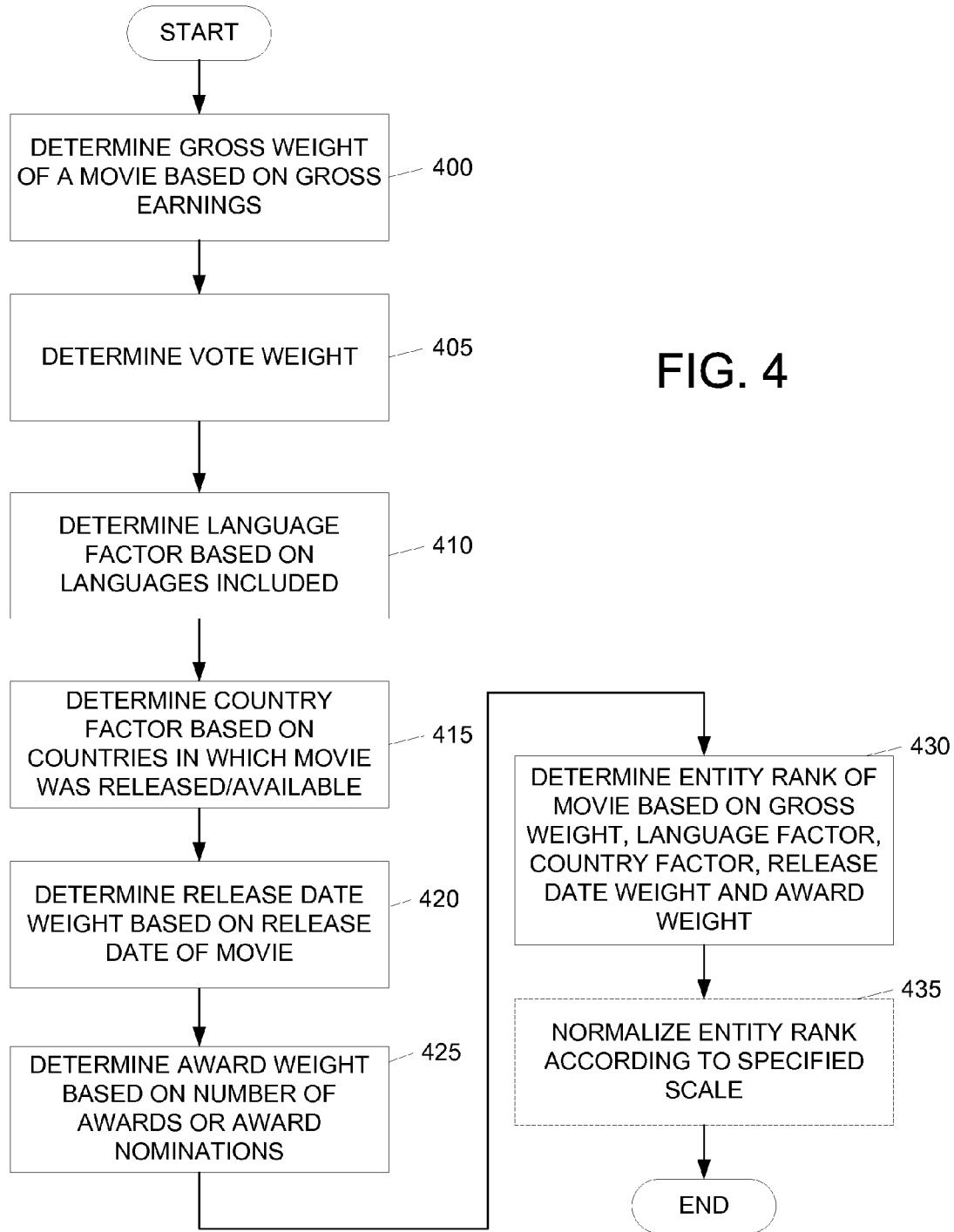
FIG. 4 illustrates an example method for determining an entity rank according to one or more aspects described herein.

FIG. 4 illustrates an example method for determining an entity rank for a movie. In step 400, a gross weight of the movie is determined. Gross weight relates to the gross earnings of the movies and may be determined based on a conversion table. For example, a conversion table may specify that gross earnings of $50 million or less corresponds to a gross weight of 0.5 while gross earnings of more than $500 million corresponds to a gross weight of 1.0. Earnings information for a movie may be obtained from various sources including movie information databases such as IMDB.COM. In step 405, a vote weight may be determined for the movie. Vote weight refers generally to a number of votes the movie has received. In one example, a vote may be indicative of approval or enjoyment of the movie. According to one embodiment, vote weight may be calculated according to the formula:

$$\text{vote weight} = \frac{\sqrt{\text{votes\_received}}}{400}$$

In step 410, a language factor may be determined based on the language or languages included in the movie. For example, if the movie includes English as the only language, the language factor may be 1.0. Alternatively, if the movie includes English, but not as the only language, the language factor may equal 0.75. In step 415, a country factor may be determined based on the number of countries in which the movie was released may be determined. The country factor may be dependent on whether a specific country is listed (e.g., the United States), whether countries speaking a specified language (e.g., English) are listed and the like. In one example, if the United States is the only country listed, the country factor may equal 1.0, while if only English-speaking countries are listed, the country factor may equal 0.95. In step 420, a release date weight may be determined based on a date on which the movie was released. FIG. 7 illustrates a table for converting a release age to a release date weight. In step 425, an award weight may be calculated based on the number of awards for which the movie has been nominated or awarded. In one example, the award weight may be calculated according to the formula:

award weight=# of awards nominated for or received/5

In step 430, an overall entity rank for the movie may be determined based on one or more of the gross weight, award weight, language factor, country factor, release date weight and the vote weight. For example, the entity rank may be determined according to the formula:

Entity Rank=((gross weight+award weight)*language factor*country factor*release date weight)+vote weight Optionally, in step 435, the entity rank may be normalized to a predefined scale such as 0 to 1. Entity ranks may be scaled according to a type of entity. Thus, in one configuration, movie entity ranks may be comparable with other movie entity ranks but not with person entity ranks or book entity ranks (i.e., different scales are used). Alternatively, a global or universal scale may be used in which entity ranks for different types of entities are converted to a universal scale. For example, a linear conversion may be used to translate entity-type specific ranks to a universal rank.

The above described method for determining entity rank for movies may be applied in similar fashion to other types of content items including books, television shows, music and the like. One or more factors may be eliminated or replaced according to the type of content item. For example, instead of using a gross earnings weight for television shows, a Nielsen rating weight may be used instead. In one embodiment, television shows may be assigned an entity rank based on the formula:

Entity Rank=log (1.0+number of query matches), where the number of query matches may correspond to a number of television programs matching a user's search query in a television guide database or a TV planner search log. A TV planner may include an interface such as a website that presents television schedules in a specified format (e.g., a grid). The planner may further include a search bar that allows users to search for a program by entering various search criteria. Accordingly, the planner search log may store the queries that are entered into the search interface. In one or more arrangements, a planner search log may further store or record user interactions with search results or items in the TV planner. For example, the TV planner search log may store a number of clicks or selections of programs. Such information may be useful for disambiguating between programs that share a title. For example, if a user searches for "MOVIE 123" and two movies exist with the name "MOVIE 123," the system may look to a number of clicks to determine which of the two movies is a closer match. This technique assumes that given two different programs that share a name, the one more people click on should be considered to be the program people are looking for.

In one or more arrangements, relevance ranks may correspond to a numerical value. For example, all content items categorized to a first category may be given an initial value of 0.8 while all content items categorized to a second group or category may be given an initial value of 0.7. The values may be incremented or decremented based on the factors described herein such as entity rank, recency, proximity and the like. In one or more configurations, a value of a content item might not be incremented above or decremented below a threshold value so that content items in the first group remain above (or below) the second group according to the specified hierarchy.

In addition to movies and other content items, individuals may also be given an entity rank. In particular, individuals associated with movies and other content items may be assigned an entity rank that is determined relative to the content item to which they are associated. For example, an actor may be assigned an entity rank that is derived from an entity rank of a movie in which he or she had a role, the role's recency and the role's prominence (e.g., leading actor vs. an extra). Alternatively, an entity rank for a person may be determined independently of movie or television roles.

Figure 5:
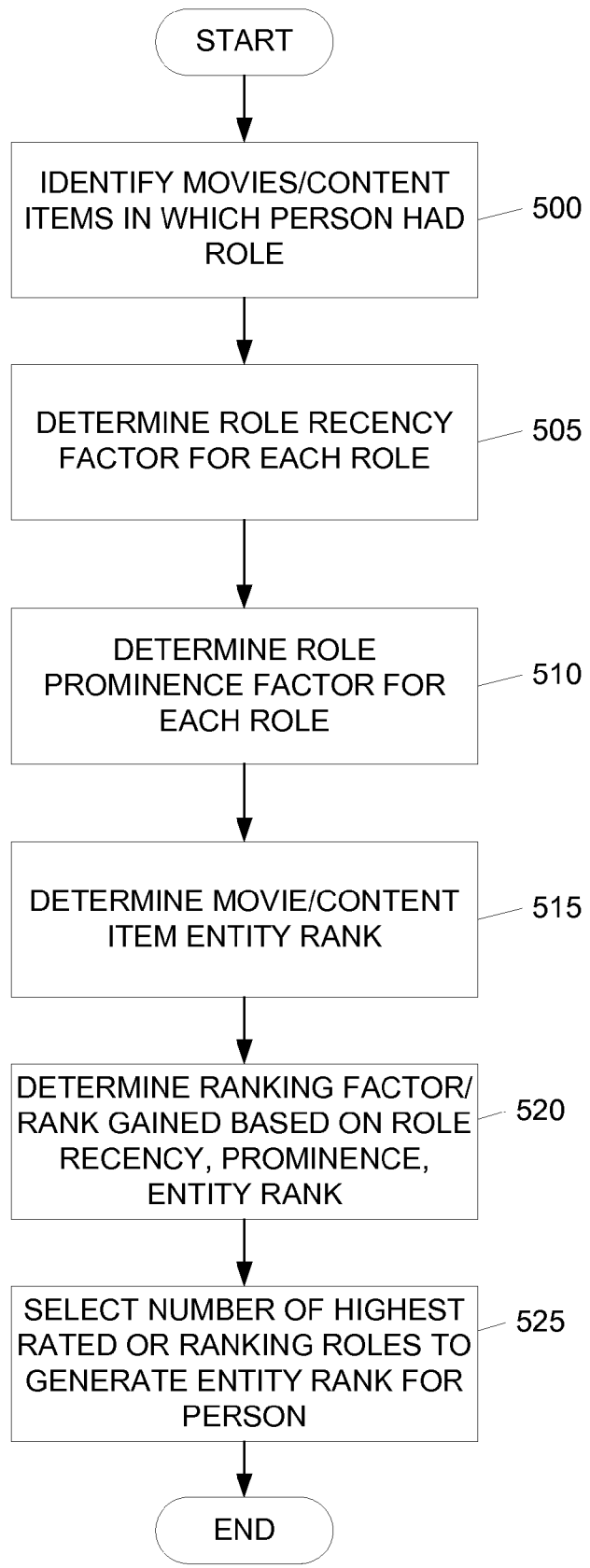
FIG. 5 illustrates an example method for determining a relevance rank according to one or more aspects described herein.

FIG. 5 illustrates an example method for determining an entity rank for a person based on the person's role or role(s) in content items. In step 500, a ranking system may identify each movie or other content item in which the person had a role. Such information may be obtained from movie or content information databases such as IMDB or AMG. In step 505, the ranking system may determine a role recency factor based on when a particular movie role the occurred. FIG. 8 illustrates a table that converts the time at which the role occurred to a role recency factor. For example, roles that occurred in 2007 or later may be assigned a role recency factor of 2.5 while roles that occurred between 2004 and 2005 may be assigned a factor of 1.25. Referring again to FIG. 5, the ranking system may subsequently determine a role prominence factor in step 510. Role prominence may be evaluated differently for acting, directing and producing. In one example, all producing roles may be assigned a prominence factor of 0.1. Directing roles, on the other hand, may be assigned differing values depending on whether the movie for which the person was a director was nominated for a best director award. If so, the role prominence factor may be assigned a value of 0.4. If not, the role prominence factor may be assigned a value of 0.2.

Acting roles, on the other hand, may be assigned a factor value based on the role's casting order in the movie. For example, if the cast order is between 1 and 3, inclusive, the prominence factor may be assigned a value of 1. Any roles having a cast order over 3 may be assigned a value of 0.1. FIG. 9 illustrates a table that specifies factor values corresponding to cast order and other parameters. For example, a parameter other than cast order that may be considered in determining a level of acting renown or prominence is whether the individual was named in one list versus another (e.g., All Movie Guide list versus Internet Movie Database list). A role may be evaluated in a hierarchical order according to table 900. That is, the role may first be evaluated against parameters 902. If the role does match, the corresponding value may be assigned (e.g., 1) and the comparison process may end. If, however, the role does not match parameters 902, the role may be compared to parameters 904 and so on until a match is found.

Referring again to FIG. 5, if an individual is both an actor in a movie and the director, two separate person-movie relationships may be generated. In step 515, the movie or content item's entity rank may be determined. A ranking factor or rank gained by the person for the movie or other content item role may then be determined in step 520. The rank gained may, for example, be calculated by taking the multiplicative product of the recency factor, the role prominence factor and the entity of the movie or other content item.

The above process (i.e. steps 505-520) may be repeated for each movie or other content item identified in step 500. In step 525, a predefined number of highest rated or ranking roles (i.e., person-movie relationships) may be selected and combined to generate an entity rank for the individual. In one example, the rank gained for each of the highest person-movie relationships may be added together to derive the entity rank of the person.

In various circumstances, an entity rank for a content item may be modified in response to a particular search query. In one example, if a user searches for "Actor One" and a movie matches the search because actor Actor One has a role in the movie, the rank for the movie may be modified because the match was not a match of the movie's title, but rather a cast or person attribute. Accordingly, the movie's entity rank may be modified based on an entity adjustment coefficient and a cast adjustment coefficient. The entity adjustment coefficient may be defined as: the movie's original entity rank/(the original entity rank+30). The cast adjustment coefficient, on the other hand, may be computed based on a conversion table. For example, a first or second cast order may correspond to a cast adjustment coefficient of 1.0, a third cast order may correspond to a coefficient of 0.33, a fourth cast order may correspond to a coefficient of 0.1 and cast order above 4 may correspond to the formula: $1/(2*(N-1)^2)$, where N is the cast order. Once the cast adjustment and entity adjustment coefficients have been determined, the adjusted entity rank may be calculated based on a formula such as original entity rank * cast adjustment coefficient * entity adjustment coefficient. Various other algorithms or formulas may also be used.

Figure 6:
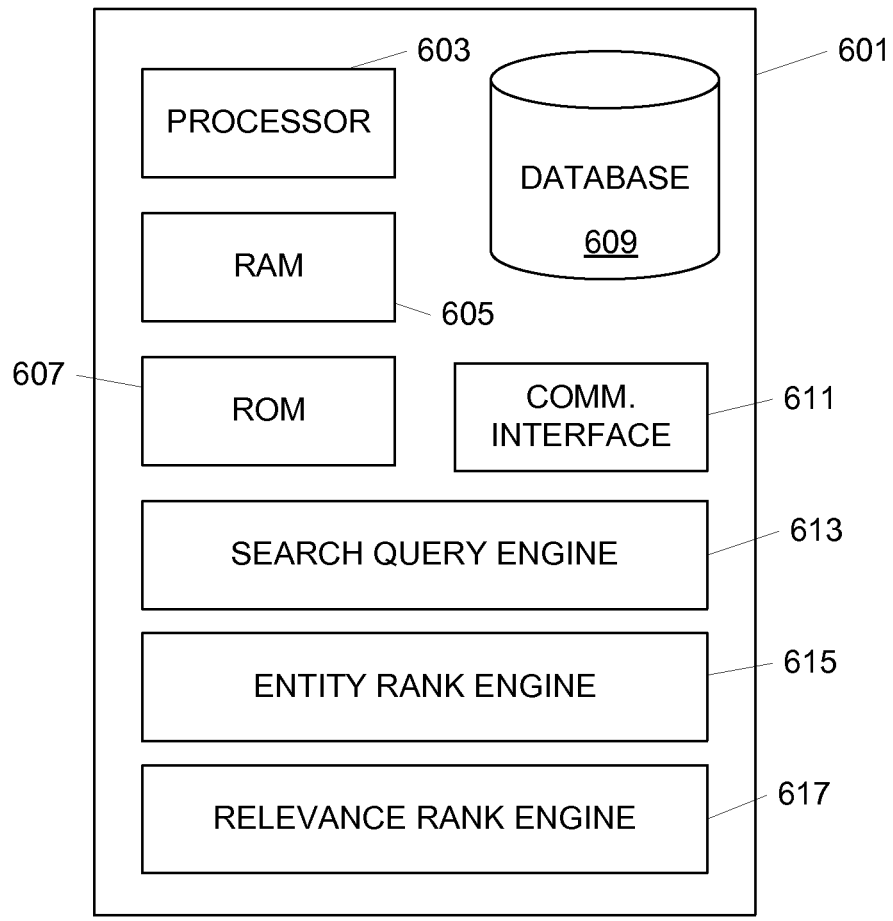
FIG. 6 illustrates a block diagram of an example ranking system according to one or more aspects described herein.

FIG. 6 illustrates a block diagram of a system configured to rank entities according to multiple factors. Ranking system 601 may include a processor 603 configured to execute instructions and carry out mathematical calculations, memory such as random access memory (RAM) 605, read only memory (ROM) 607 and database 609. Database 609 may be configured to store a variety of information such as application data, user preference information, entity information, entity identifiers, content items, application programming and the like. Communication interface 611 may be included in system 601 so that external information (e.g., data from external websites or databases) may be accessed. System 601 includes three engines for ranking search results according to user relevance: query engine 613, entity rank engine 615 and relevance rank engine 617. Query engine 613 may be configured to receive a search query from a user and determine a list of matching or potentially matching items. The list may then be fed into relevance rank engine 617 that is configured to evaluate each item to determine a relevance rank according to aspects described herein. Part of the relevance rank processing may include the determination of an entity rank. Entity ranks may be generated by entity rank engine 615 and stored in database 609 for retrieval by various other modules of ranking system 601. Entity rank engine 615 and/or relevance rank engine 617 may be configured to modify entity ranks in response to a user query if necessary. The modules and components of system 601 may exist in the same physical device or may be located in different devices and/or locations. Additionally, the modules and components may include hardware, software, firmware and/or combinations thereof.

Figure 10:
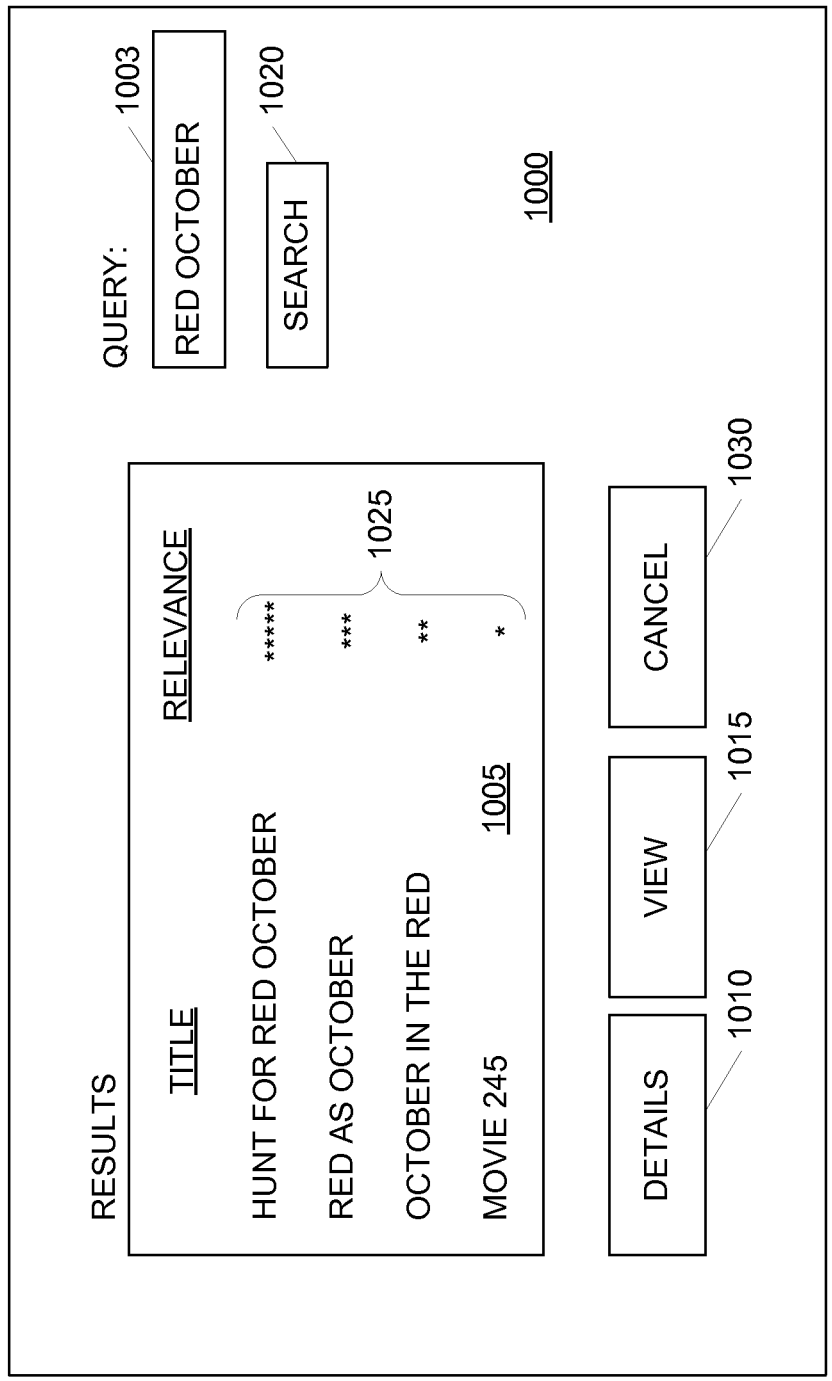
FIG. 10 illustrates an example search results interface according to one or more aspects described herein.

FIG. 10 illustrates an example search results interface displaying a list of results matching a user query. Interface 1000 may include a search query box 1003 in which a user's current query is displayed and modifiable. Interface 1000 may further include a list 1005 of search results ordered according to the methods and aspects described herein. For example, in response to the user's query of "RED OCTOBER," the interface 1000 may provide of list 1005 that includes results such as "HUNT FOR RED OCTOBER," "RED AS OCTOBER," "OCTOBER IN THE RED" and "MOVIE 245." Based on the various ranking mechanisms described, "RED AS OCTOBER" may be ranked behind "HUNT FOR RED OCTOBER" based, at least in part, on proximity. "MOVIE 245" may be ranked, but placed in the lowest relevance position because RED OCTOBER may match an actor's name, rather than a title. Accordingly, MOVIE 245's entity rank may have been modified in response. Details option 1010 may allow a user to view a full description of the movie and view ranking details while view option 1015 may allow the user to watch the content item. Search option 1020 may be provided so that a user may reformulate and reexecute his or her search. Cancel option 1030 may return a user to a previous screen. Additionally or alternatively, list 1005 may include an indicator 1025 of relevance.

According to one or more aspects, a query might not be spell checked if it is assumed that users will be copying/pasting program names directly into a search query field. Thus, some processing power and time may be saved by removing the need for spell checking Alternatively or additionally, a search and rank system might only look for exact matches between queries and program names.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A computer-implemented method, the method comprising:
   determining, by a computing device based on a content item search query, a plurality of content items comprising a first content item and a second content item;
   modifying a previously defined hierarchy of a hierarchical set of groups based on the content item search query;
   categorizing, by the computing device, the plurality of content items into the hierarchical set of groups comprising a first group and a second group, wherein the first group of the hierarchical set of groups corresponds to a first query match factor and the second group of the hierarchical set of groups corresponds to a second query match factor different from the first query match factor;
   sorting, by the computing device, content items categorized in the first group based on a corresponding popularity value of each content item categorized in the first group and independently of sorting content items belonging to the second group;
   after sorting the content items categorized in the first group, generating, by the computing device, a ranked list of content items by ordering the content items belonging to the first group higher in the ranked list than all content items belonging to the second group; and
   providing at least a portion of the ranked list as a response to the content item search query.

2. The computer-implemented method of claim 1, wherein categorizing the plurality of content items comprises categorizing a first content item in the first group upon determining that the first content item is assigned a popularity value.

3. The computer-implemented method of claim 2, wherein categorizing the plurality of content items further comprises categorizing content items, not previously assigned a popularity value, to the second group.

4. The computer-implemented method of claim 1, further comprising sorting content items categorized in the second group separately from sorting the content items categorized in the first group.

5. The computer-implemented method of claim 1, wherein the first group of the hierarchical set of groups is specific to a predefined type of content item such that only content items of the predefined type are categorized into the first group.

6. A computer-implemented method comprising:
- determining, by a computing device, popularity values for a plurality of content items based on a corresponding type of content item, wherein a popularity value for a first type of content item is determined differently than a popularity value for a second type of content item;
- receiving a search query;
- modifying the popularity values based on the search query;
- comparing a first modified popularity value of a first content item of at least two content items to a second modified popularity value of a second content item of the at least two content items;
- in response to determining that the first modified popularity value is equal to the second modified popularity value, ranking the first content item and the second content item based on a factor other than modified popularity value; and
- in response to the ranking, returning a ranked list of the at least two content items of the plurality of content items as results for the search query.

7. The computer-implemented method of claim 6, wherein the search query is received prior to determining the corresponding popularity values for the at least two content items.

8. The computer-implemented method of claim 6, wherein the popularity values corresponding to the at least two content items are determined independently of a degree of match between each of the at least two content items and the search query.

9. The computer-implemented method of claim 6, wherein the factor comprises a degree of match with the search query.

10. The computer-implemented method of claim 6, wherein the first type of content item corresponds to movies and wherein the popularity value for movies is determined based on at least one of: gross earnings, votes by one or more users, movie release date, a number of awards received and a type of award received.

11. The computer-implemented method of claim 10, wherein the popularity value for movies is further determined based on a popularity value of an actor.

12. The computer-implemented method of claim 6, wherein the first type of content item corresponds to television shows and wherein the modified popularity value for television shows is determined based on a number of times a specified television show is identified as a match with search queries.

13. The computer-implemented method of claim 6, further comprising scaling the popularity value of the second type of content item to a scale common to multiple types of content items.

* * * * *